US009245317B2

(12) United States Patent
Abnet et al.

(10) Patent No.: US 9,245,317 B2
(45) Date of Patent: Jan. 26, 2016

(54) OPTICALLY ENHANCED DIGITAL IMAGING SYSTEM

(75) Inventors: Charles Cameron Abnet, Waltham, MA (US); Daniel Leibovich Feldkhun, Boulder, CO (US); Michael Stephen Mermelstein, Cambridge, MA (US)

(73) Assignee: Cascade Microtech, Inc., Beaverton, OR (US)

( * ) Notice: Subject to any disclaimer, the term of this patent is extended or adjusted under 35 U.S.C. 154(b) by 688 days.

(21) Appl. No.: 13/592,220

(22) Filed: Aug. 22, 2012

(65) Prior Publication Data

US 2013/0044203 A1   Feb. 21, 2013

Related U.S. Application Data

(63) Continuation of application No. 11/263,592, filed on Oct. 31, 2005, now abandoned.

(60) Provisional application No. 60/624,326, filed on Nov. 2, 2004.

(51) Int. Cl.

| | |
|---|---|
| G06T 3/40 | (2006.01) |
| G02B 21/02 | (2006.01) |
| G02B 21/18 | (2006.01) |
| G02B 21/36 | (2006.01) |
| H04N 1/393 | (2006.01) |
| H04N 5/232 | (2006.01) |

(52) U.S. Cl.
CPC ............ *G06T 3/4069* (2013.01); *G02B 21/025* (2013.01); *G02B 21/18* (2013.01); *G02B 21/365* (2013.01); *H04N 1/393* (2013.01); *H04N 5/23296* (2013.01)

(58) Field of Classification Search
CPC ........................................................ H01J 37/28
See application file for complete search history.

(56) References Cited

U.S. PATENT DOCUMENTS

| | | | |
|---|---|---|---|
| 2002/0176160 A1* | 11/2002 | Suzuki et al. ................. | 359/380 |
| 2004/0075837 A1* | 4/2004 | Maeda et al. ................. | 356/394 |
| 2005/0162512 A1* | 7/2005 | Seakins .......................... | 348/62 |

OTHER PUBLICATIONS

Nikon Coolscope overview, May 2003.
Keyence Digital Microscope overview.
PowerPoint Presentation entitled "An APD Test Solution 01 on SUSS PA200" by Karl Suss.
Spec Sheet, Mar. 23, 2001.
Spec Sheet for VS-TC series (Short WD), Jan. 1, 2002.

* cited by examiner

*Primary Examiner* — Jeffeery Harold
*Assistant Examiner* — Justin Sanders
(74) *Attorney, Agent, or Firm* — Dascenzo Intellectual Property Law, P.C.

(57) ABSTRACT

Improved methods and systems for imaging are provided. Specifically, systems and methods for extending the range of a digital zoom are provided in which an imaging system provides continuous magnification over a plurality of interleaved optical pathways and digital zooming imagers. Systems and methods of centering an image as the field of view changes, and for masking out undesirable obstacles from a magnified image are also provided.

22 Claims, 8 Drawing Sheets

OPTICALLY ENHANCED DIGITAL IMAGING SYSTEM

CROSS-REFERENCE TO RELATED APPLICATION

The present application is a continuation of, and claims priority under 35 U.S.C. §120 to, U.S. patent application Ser. No. 11/263,592, which was filed on Oct. 31, 2005, and which claims priority under 35 U.S.C. §119(e) to U.S. Provisional Patent Application Ser. No. 60/624,326, which was filed on Nov. 2, 2004, and the complete disclosures of which are hereby incorporated by reference.

FIELD OF THE INVENTION

The present invention relates to optically enhanced digital imaging systems, and specifically to improved systems and methods for multi-path optical magnification of a digitally zoomable image.

BACKGROUND OF THE INVENTION

Many scientific and engineering applications require individuals to be able to see and manipulate items which are not visible with the naked eye. Semiconductor manufacturers, for example, must be able to examine and probe micro and nano-scale circuits fabricated on various substrates. Similarly, biological researchers must be able to see and manipulate cells, proteins, micro-organisms and other microscopic elements within their laboratories. Microscopic and metrologic applications are as prevalent and diverse as the engineers, scientists and developers (collectively, end-users) who promulgate them. However, existing tools do not provide many of the features desired by these end-users.

Optical microscopes allow end-users to see many objects too small to be visible to the unaided eye. Compound microscopes, in use since the late 1500 s, typically use a plurality of lenses to magnify an image. Modem compound microscopes use multiple glass lenses within the objective and ocular assemblies. In addition, modern compound microscopes typically provide multiple objective lenses, which may be rotated or otherwise interchanged, such that a single compound microscope can magnify an object up to about 1000×, in discrete steps (e.g., 4×, 10×, 400×, etc.).

Currently, optical zoom systems are used in microscopes in conjunction with an objective lens to provide a continuously variable magnification. Zoom systems are typically composed of two or more individual lenses whose axial position relative to one another is varied by some mechanical means. Often motors are used to facilitate the motion of the individual lenses.

The stereo, binocular or dissecting microscope is similar to the compound microscope, except that it uses two eyepieces (or sometimes two complete microscopes) to provide slightly different viewing angles to the left and right eyes. In this way, the stereo microscope produces a three dimensional visualization of the sample being examined.

Recently, digital imagers have been coupled to compound or stereo microscopes in order to digitize and manipulate magnified images of an object under examination. In the most widespread application, a digital camera or imager is attached to the microscope either at an eyepiece assembly, or at a dedicated port. The images captured by the imager are then typically fed into a computer and displayed on a monitor or stored for later usage. In addition, recent digital imagers have been attached to compound microscope assemblies without eyepieces for direct human observation.

SUMMARY OF THE INVENTION

Like the compound microscopes upon which they are based, existing digital imagers only allow end-users to view objects through one objective lens at a time. Thus, the end-users must manually switch optical magnification modes, abruptly transitioning between 4×, 10× and 400× optical magnification, for example. Due to these abrupt magnification changes, the field of view often crops out interesting objects, requiring time-consuming adjustments to the object's position.

Furthermore, microscopes containing optical zoom systems suffer from errors in alignment as the lenses are translated. The moving mechanical components in the systems wear over time and motors produce unintended vibrations in the images.

Accordingly, what is needed is an improved system for digital imaging which is able to continuously zoom in and out on an object. In addition, a need exists for an imaging system which does not have moving parts within the optical pathway. Finally, a need exists for systems and methods for tracking objects as an image is magnified in order to crop and center upon items of interest.

In satisfaction of these needs and others, embodiments of the present invention provide continuous-zoom systems and methods which employ multiple optical pathways and digital zooming techniques. In addition, embodiments of the provided system allow an end-user to simultaneously view and manipulate multiple images at various magnifications. Furthermore, embodiments of the provided system automatically crop, scale and center images as the magnification level changes.

In accordance with one embodiment of the invention, an imaging system is provided having a range-extended digital zoom. This imaging system includes a first optical path which projects a first image upon a first digital imager at a first magnification and a second optical path which projects a second image upon a second digital imager at a second magnification. The imaging system is also configured to digitally zoom the first image between the first magnification and the second magnification using said first optical path, and to digitally zoom the second image between the second magnification and a third magnification using the second optical path. The imaging system also preferably includes electronic components that are able to store and transmit data, such that an end-user or computer system can be automatically appraised of the individual components within the imaging system.

In accordance with another embodiment of the invention, a method of providing continuous magnification within an imaging system over an extended zoom range is provided. The method includes the following steps: presenting a first image that has been magnified by way of a first image path; digitally zooming within the first image within a range bounded by a first magnification provided in the first image path and a second magnification provided in a second image path; and, when the digitally zoomed first image meets or exceeds the second magnification, presenting a second image that has been magnified by way of the second image path.

In accordance with a third embodiment, a method of virtually removing obstructions in an image is provided. The method includes the following steps: recording a first image of a background and an obstruction at a first point in time $T_0$; recording a second image of the background and the obstruction at a second point in time $T_1$; and if the obstruction or background has shifted between time $T_0$ and time $T_1$ such that different portions of the background have been revealed, creating a composite image by replacing each portion of the obstruction with a corresponding portion of background revealed during either $T_0$ or $T_1$.

In accordance with a fourth embodiment, a digital image editing system is provided. The digital editing system is configured to virtually remove obstructions from an image by performing the following steps: recording a first image of a background and an obstruction at a first point in time $T_0$; recording a second image of the background and the obstruction at a second point in time $T_1$; and if the obstruction or background has shifted between time $T_0$ and time $T_1$ such that different portions of the background have been revealed, creating a composite image by replacing each portion of the obstruction with a corresponding portion of background revealed during either $T_0$ or $T_1$.

In accordance with a fifth embodiment, a digitally zooming microscope is provided. The microscope preferably includes a light source for illuminating an object to be imaged, a first optical path which projects an image of the object upon a first digital imager at a first optical magnification; and a second optical path which projects another image of the object upon a second digital imager at a second optical magnification. The microscope also preferably includes a display for showing one or more magnified images. In addition, the microscope is preferably configured to digitally zoom in and out on the object between the first magnification and the second magnification using said first optical path, and to digitally zoom in and out on the object between the second magnification and a third magnification using the second optical path.

In the final embodiment, a digital optical probe system is provided. The probe system includes a probe, a stage, and an imaging system containing at least two optical paths. The imaging system is configured to provide continuous zooming within magnified images of an object placed upon the stage through a traversal of interleaved levels of digital magnification and optical paths.

BRIEF DESCRIPTION OF THE DRAWINGS

These embodiments and other aspects of this invention will be readily apparent from the detailed description below and the appended drawings, which are meant to illustrate and not to limit the invention, and in which:

FIG. 9b is a diagram of the superpositioning of images from the embodiment of FIG. 9a.

DETAILED DESCRIPTION OF THE PREFERRED EMBODIMENTS

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

In general, the present invention comprises a multi-path optical imaging system with continuous digital zoom capability enhancing a plurality of optical magnification levels.

Figure 1:
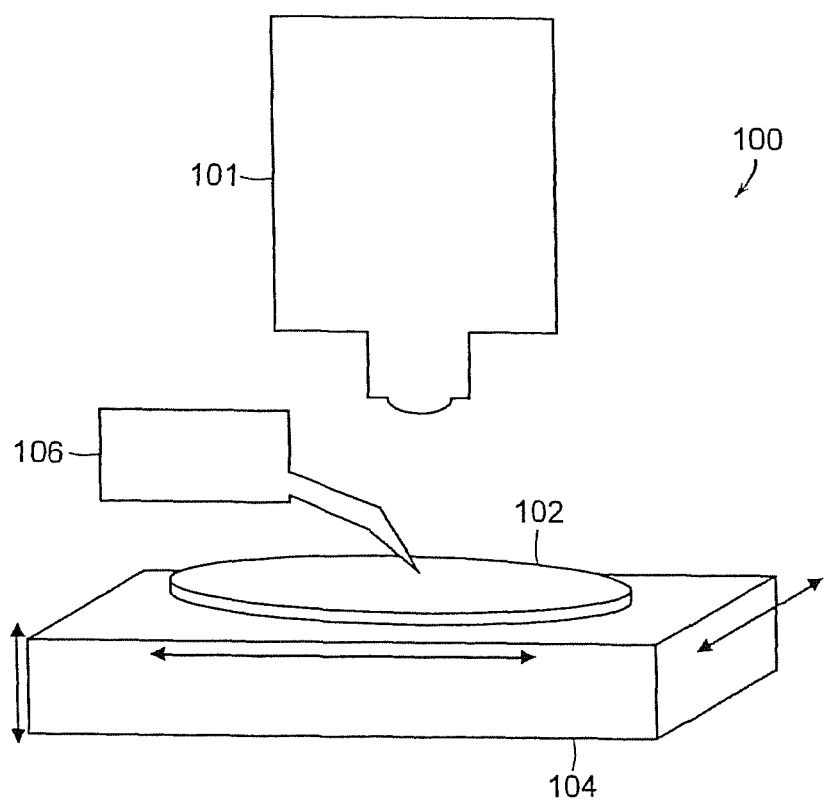
FIG. 1 is a block diagram illustrating one embodiment of a digital optical probe system.

FIG. 1 is a block diagram illustrating one embodiment of a digital optical probe system 100. The digital optical probe system, 100 includes an imaging system 101, a movable stage 104, a target specimen or substrate 102 and a probe 106. As shown, the imaging system 101 is oriented towards the substrate 102. The substrate 102 is positioned upon the movable stage 104, which typically has at least three degrees of freedom. The stage 104, is preferably adjustable along the x, y and z axes, and is controllable by an end-user. A probe 106 is used to manipulate the substrate 102 upon the stage 104. The probe can be used to hold the substrate 102 in place or to adjust the substrate 102 by very small amounts. In various embodiments, the probe may test the substrate 102 electrically, optically, chemically, or through various nearfield magnetic or other atomic interactions. In another embodiment, the probe provides the ability to adhere to or provide suction to the substrate 102, or the ability to deposit solids, liquids, upon the substrate 102. Preferably, the imaging system 101, probe 106 and stage 104 are in electrical communication with a computer or other processing apparatus.

It is important to note that although the illustrated embodiments refer to a substrate 102 as the imaged object, any other object may be used. For example, the techniques and system employed herein may be used to image biological or chemical specimens, smears, or cultures. In alternate embodiments, the imaging system 101 may be used within a telescope to view distant objects, both terrestrial and celestial.

Figure 2:
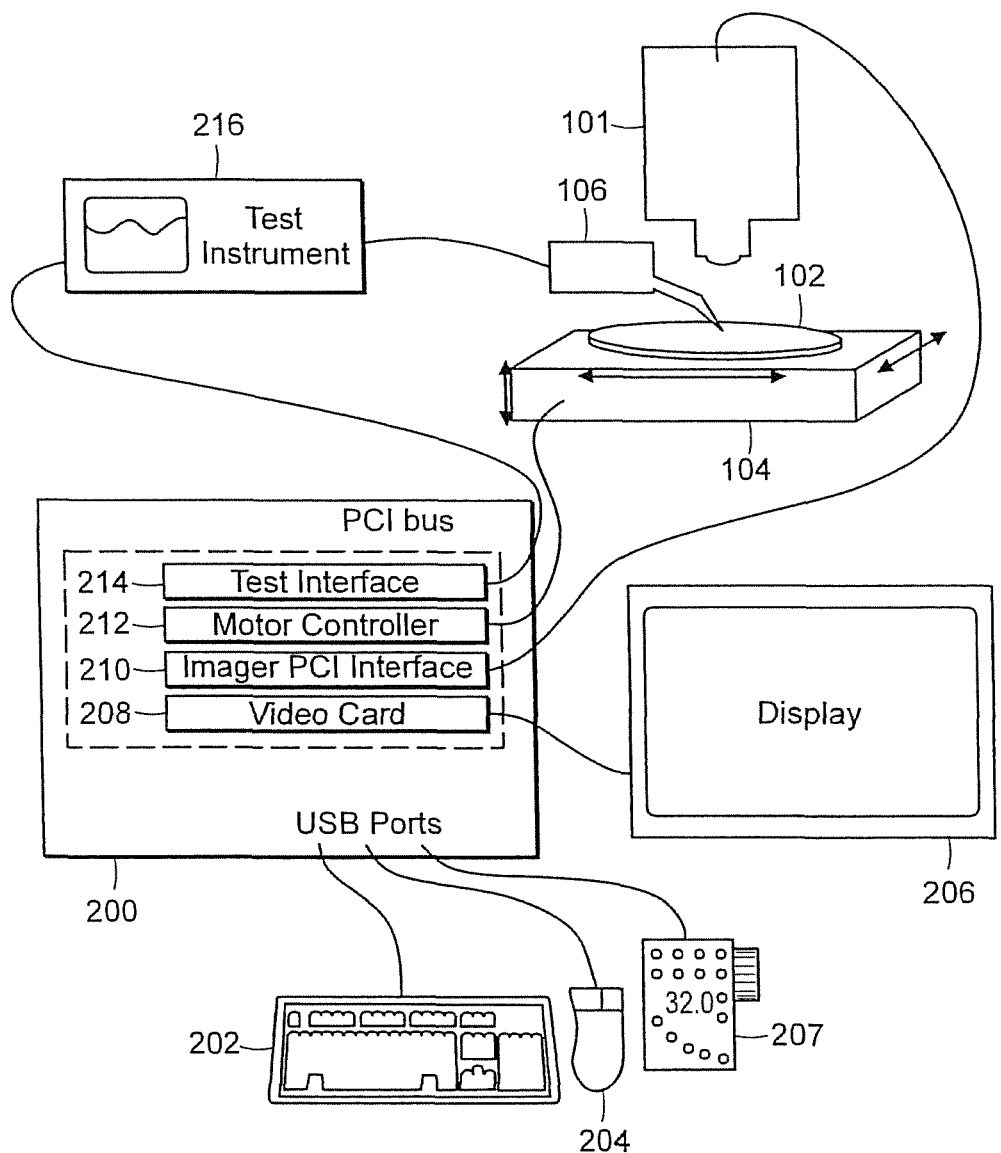
FIG. 2 is a block diagram illustrating connections between the imaging system constructed in accordance with the invention and a computer system.

FIG. 2 is a block diagram illustrating connections between the imaging system 101 constructed in accordance with the invention and a computer system 200. In the preferred embodiment, the computer system 200 controls the imaging system 101. The computer system 200 may also communicate with the stage 104 and the probe 106, either directly or indirectly.

The computer system 200 is well known to those skilled in the art. In the preferred embodiment, the computer system 200 is connected to a variety of Input/Output (I/O) devices. These may include, for example, a keyboard 202, mouse 204 and display 206. The computer system 200 may also optionally interface with a remote control 207 for the probe system 100.

The computer system 200 preferably interfaces with the I/O devices, as well as the imaging system 101, probe 106 and stage 104 through a PCI or other bus, and appropriate controller hardware. This controller hardware includes a video card 208, an imager PCI interface card 210, a motor controller card 212 and a test interface card 214. As will be apparent to those skilled in the art, the video card 208 can be used to control the display 206. Similarly, the imager PCI interface card 210 preferably controls the imaging system 101, while the motor controller interface card 212 orchestrates the movements of the stage 104.

As illustrated, the test interface card 214 preferably connects the computer system 200 to a test instrument 216. In this embodiment, the test instrument 216 controls the testing of the substrate 102 or the actuation of the probe 106. The electrical testing may include applying electrical signals intended to actuate various miniature, moveable structures such as microelectromechanical systems (MEMS). It is understood that a variety of probes can be employed. For example, probes may measure and/or intentionally alter pH, temperature, concentrations of chemical species, light intensity. Furthermore, probes may be used for the physical manipulation of the substrate or devices on the substrate as well as for the delivery of fluids, solids, and/or gases to the substrate.

Figure 3:
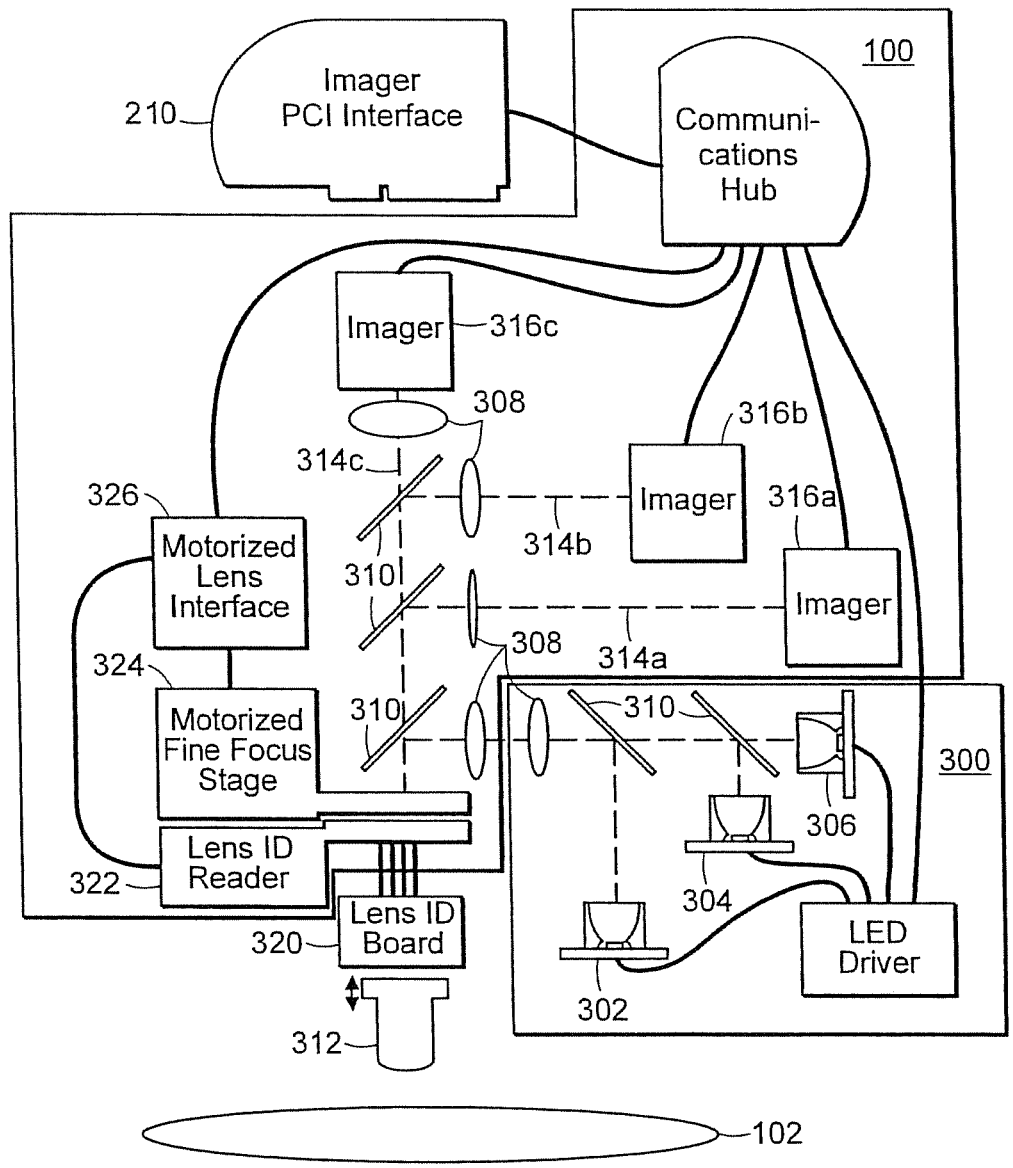
FIG. 3 provides a more detailed view of the digital optical probe system constructed in accordance with the invention.

FIG. 3 provides a more detailed view of the digital optical probe system 100. In this embodiment, the probe system 100 is in electrical communication with the PCI interface card 210 and with an illuminator 300.

The illuminator 300 comprises a source of illumination for the substrate 102. In the illustrated embodiment, the illuminator includes an LED driver 301, as well as red, green and blue LEDs 302-306. The LED driver 301 controls the intensity, duration and frequency of the light output from the LEDs 302-306. One skilled in the art will recognize that, instead of using red, green and blue LEDs, other sources of visible and invisible light may be used. For example, a white bulb could be used, as could a source of infra-red, fluorescent or ultraviolet light. Furthermore, illumination parameters other than wavelength such as the polarization of the light and the numerical aperture of the lenses 308 can be varied. In any event, the light from these LEDs 302-306 is then preferably passed through a series of beam splitters 310 and lenses 308, and through an objective lens 312, until it ultimately illuminates the substrate 102.

The objective lens 312 is preferably coupled to a lens I.D. unit 320 capable of storing information about the objective lens 312. The lens I.D. unit can store information about the objective lens 312 including, but not limited to its abnormalities, usage, settings and calibration. So, when used with the imaging system 101, a specific objective lens 312 can communicate data to the computer system 200 relating to its attributes. Either an end-user or the computer system 200 may then use this attribute information in order to correct for problems and to generate the best possible images. Similarly, the end-user or computer system 200 may write data to the lens I.D. unit 320.

The reads and writes to the lens I.D. unit 320 are facilitated by the lens I.D. reader 322. Preferably, the lens I.D. reader 322 is in electrical communication with the lens I.D. unit 320, after the objective lens 312 is inserted into the imaging system 101. Each objective lens used will contain its own information, and thus the imaging system 101 may specifically identify and interface with a variety of objective lenses. Advantageously, this feature prevents time-intensive manual calibration of the imaging system 101 for each objective lens inserted. In various other embodiments, each electronic component (e.g., imagers 316, illuminators 300, lenses 308, beam splitters 310, etc.) may have its own I.D. unit and/or reader, such that the computer system 200 is automatically appraised of the individual components within the imaging system 101.

As discussed above, like the objective lens 312, each electronic component is preferably configured to store data describing its abnormalities, usage, settings and calibration. However, the electronic components themselves may be quite diverse, and may be chosen from the group consisting of one or more of:
(a) an optical lens;
(b) a source of illumination;
(c) a digital imager;
(d) an array of light emitting diodes;
(e) a communications hub;
(f) a motor;
(g) a processor;
(h) a mechanical mount; and
(g) a beam splitter, waveguide, refractor, or other optical component.

The position of the objective lens 312 is preferably controlled by a motorized fine focus stage 324. A motorized lens interface 326 controls the motorized fine focus stage 324 in response to commands from the hub.

In operation, the light emitted from the illuminator 300 preferably shines through the objective lens 312 and is reflected by the substrate 102. At that point, it again enters the objective lens 312 and is redirected and magnified by one or more beam splitters 310 and lenses 308 contained within the imaging system 101. The light travels within the imaging system 101 along one or more optical image paths 314 until it reaches one or more imagers 316. The light is then focused on each imager 316, thereby generating an image of the substrate 102.

The images which ultimately are projected upon the imagers 316 each achieve different levels of magnification. For example, image path 314a is longer, and thus has a greater focal length, than image path 314c. Accordingly, the magnification of an image of the substrate 102 will be greater along path 314a than along image 314c. Thus, in one embodiment, image paths 314c, 314b and 314a might have effective magnifications of 4×, 10× and 40×, respectively. The effective magnifications along each image path 314 can be further controlled through the use of different lenses 308 and beam splitters 310 along each image path 314. Furthermore, although only three image paths 314 are illustrated in FIG. 3, one skilled in the art will recognize that any number of image paths greater than two may be employed, to provide a broad range of optical magnification pathways.

The imagers 316 are preferably solid-state digital imaging devices, such as Charge-Coupled Devices (CCDs). The imagers 316 may capture images in black and white, color, or beyond the range of the visible spectrum. In addition, the imagers 316 may be separate devices, or may all be logical partitions of the same device. Preferably, each imager 316 has a resolution sufficient to enable the computer system 200 to digitally zoom within the image generated by that imager 316.

Figure 4:
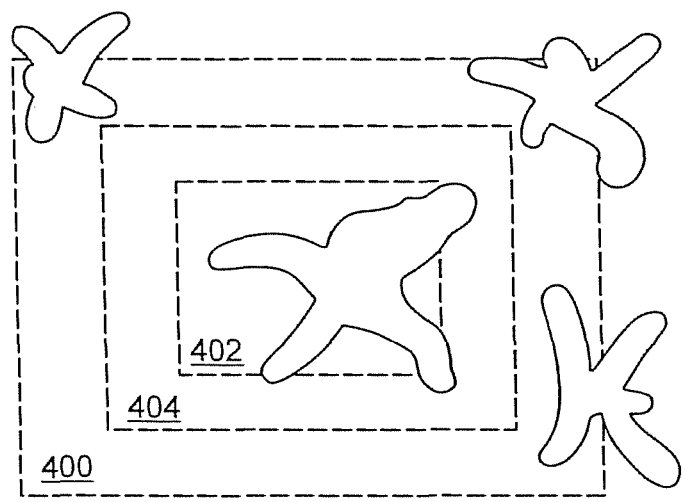
FIG. 4 illustrates the magnification of a substrate using a combination of multiple image paths with a digital zooming imager constructed in accordance with the invention.

FIG. 4 illustrates the combination of multiple image paths 314 with a digital zooming imager 316 in order to obtain a desired magnification of the substrate 102.

As discussed previously, with existing systems an end-user often had to choose between a broad field of view 400 and a narrow field of view 402 when he actually wished for an intermediate field of view 404. Existing systems provided discrete magnification levels, such that a higher magnification power would generate too narrow a field of view 402, and a lower magnification power would generate too broad a field of view 400.

Embodiments of the present invention allow digital zooming between two discrete optical magnification levels. Thus, in one embodiment, the probe system 100 allows an end-user to zoom in from the optical magnification level (i.e., image path) providing the broad field of view 400 to the desired field of view 404. In an alternate embodiment, the probe system 100 allows an end-user to zoom out from the optical magnification level providing the narrow field of view 402 to the desired field of view 404.

In order to achieve the desired magnification and field of view 404, the probe system 100 first presents a first image that has been magnified by way of a first image path 314c, preferably on the display 206. Next, the probe system 100 digitally zooms within the first image within a range bounded by a first magnification (e.g. 4×) provided in the shortest image path 314c and a second magnification (e.g. 10×) provided in an intermediate-length image path 314b. When the digitally zoomed first image meets or exceeds the second magnification, the probe system 100 presents a second image that has been magnified by way of the second image path 314b.

This process may be continued with the third pathway 314a as well. In this instance, the probe system 100 digitally zooms within the second image within a range bounded by a second magnification (e.g. 10×) provided in the intermediate-length image path 314b and a third magnification (e.g. 40×) provided in the longest image path 314a. When the digitally zoomed second image meets or exceeds the third magnification, the probe system 100 presents a third image that has been magnified by way of the second image path 314a.

Thus, the probe system 100 is configured to provide continuous zooming within magnified images of the substrate 102 through a traversal of interleaved levels of digital magnification and optical paths 314. One skilled in the art will readily recognize that zooming out of the presented image will require only the reversal of the steps outlined above.

Figure 5:
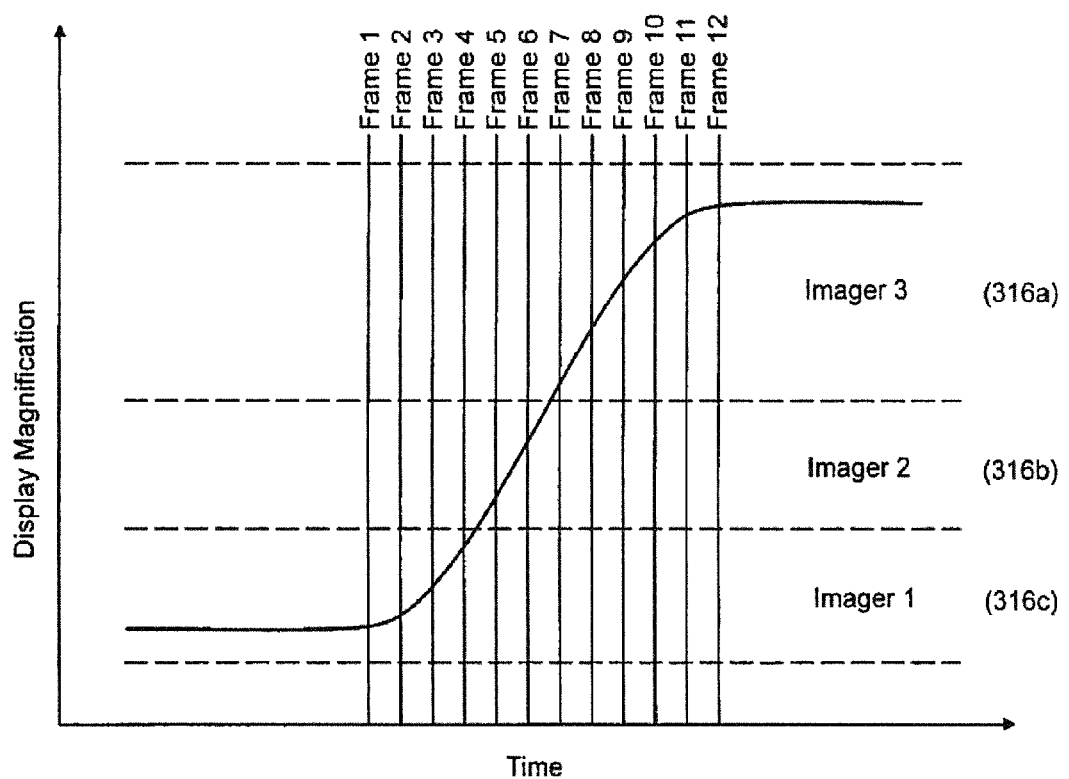
FIG. 5 illustrates the net effect of continuous zooming, according to the invention, as captured through multiple frames from a video feed.

FIG. 5 illustrates the net effect of this continuous zooming, as captured through multiple frames from a video feed. As shown, a video capture system captures twelve frames from the probe system 100. Initially, the magnification is at its lowest, and the image traverses the shortest image path 314c and is projected upon a first imager 316c (as illustrated in FIG. 3). During frames one through four, the magnification is digitally magnified until it would otherwise surpass the magnification provided by the intermediate-length image path 314b. Beginning at frame five, the presented image is generated through the intermediate-length pathway 314b and the second imager 316b. During frames five through six, the image is again digitally magnified, until it would otherwise surpass the magnification provided by the long image path 314a. Thus, beginning at frame seven, the presented image is generated through the long pathway 314a and the third imager 316a. Thereafter, the image is digitally magnified during frames seven through twelve, until the magnification reaches the desired level.

Figure 6:
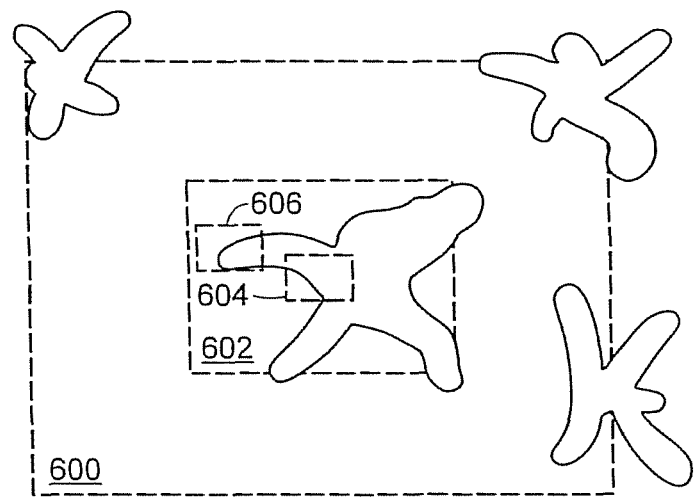
FIG. 6 illustrates the creation of a magnified field of view upon a desired location as provided by an embodiment of the invention.

One problem inherent with continuous zooming is the fact that, as the magnification increases, the field of view shrinks until objects which the end-user may wish to observe are cropped out of the picture. FIG. 6 illustrates an embodiment of the invention which allows an end-user to center a magnified field of view upon a desired location.

As illustrated in FIG. 6, the field of view shrinks from the largest field of view 600, to a smaller field of view 602, to the smallest field of view 604 as the magnification increases. To see an off-screen object, the image is adjusted until it captures the desired area, or field of view 606 with the proper magnification. This is preferably accomplished through logically shifting the field of view on a high-pixel count imager until the desired image location is shown. In alternate embodiments, software algorithms may facilitate the digital zooming and centering of the desired field of view 606 upon the preferred location. In addition, off-center or moving imagers may be used to pan a magnified image until the desired field of view is displayed.

Alternatively, the beamsplitter 310 and/or lens 308 may be moved or rotated to pan a magnified image across an imager until the desired area is captured. In one embodiment this is done by adjusting the angle of a mirror supported by a gimbal mechanism because the geometric layout of any optical path shown in FIG. 3 may be modified by including one or more mirrors to bend the path.

One skilled in the art will recognize that the target or location need not be the same for each image as magnification changes. Furthermore, two locations may generally differ by in-plane (X/Y) location or out-of-plane (Z) location, or both. By changing the focus, magnification, and imager settings, embodiments of the present invention can center on various in-plane and out-of-plane objects throughout the differing views.

Once an appropriate magnification and field of view have been detected, an end-user may explore the image while the image remains static. However, frequently there are objects within the magnified image, which complicate observation. In particular, objects that an end-user wishes to observe are occasionally hidden by the ends of the probe 106 or by other obstacles.

Figure 7:
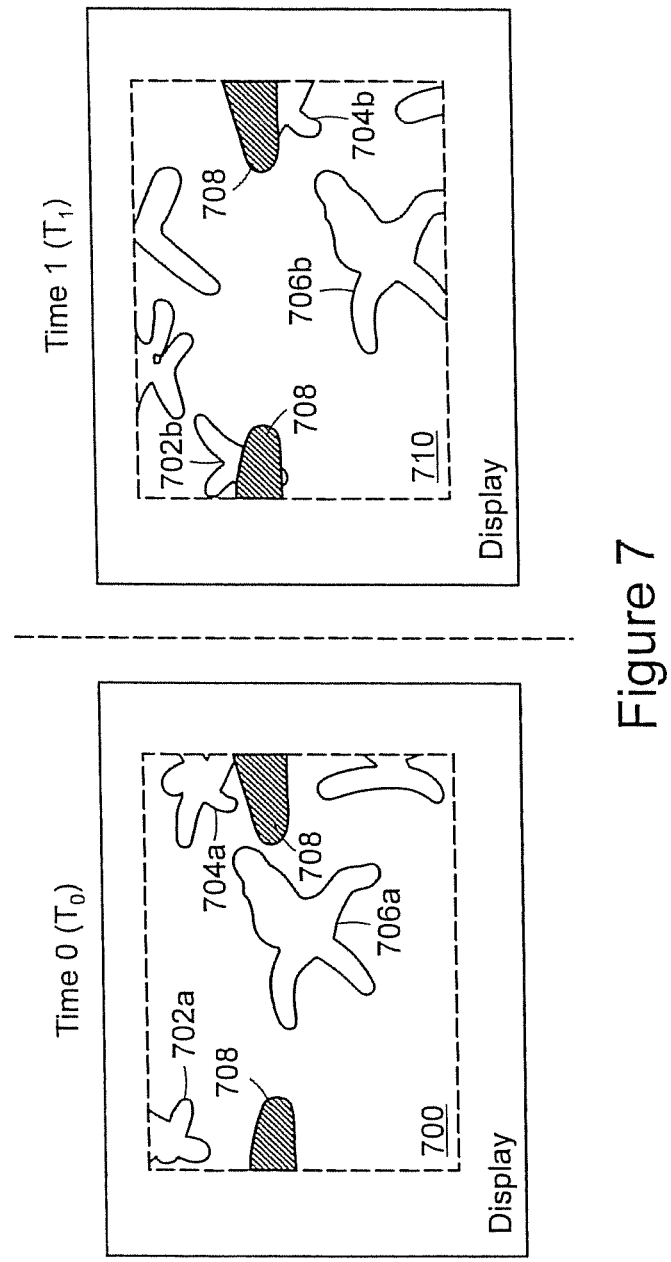
FIG. 7 illustrates how desired objects may be hidden by obstructions in a magnified image.

FIG. 7 illustrates how desired objects may be hidden by obstructions in a magnified image. As shown, at Time 0 ($T_0$), a displayed field of view 700 shows three magnified objects 702a, 704a, and 706a under observation. At $T_0$, the end-user can see the portions of the three objects 702a, 704a, and 706a that he or she wishes to observe. Also shown are two probes 708, located on either side of the image. Note that the probes do not obstruct the view of any of the objects 702a, 704a, and 706a.

At Time 1 ($T_1$) the objects 702-706 have moved relative to the probes 708 and the field of view 710. Whether the objects 702-706 have moved or the field of view 710 and probes 708 have moved is immaterial, as it is their relative motions which are problematic. Thus, at $T_1$, objects 702b and 704b have been partially obscured by the probes 708. Similarly, object 706b has moved towards the bottom of the field of view 710 such that portions of the object 706b are no longer visible.

To address this problem, embodiments of the claimed invention provide methods and systems for generating composite images which digitally remove obstructions from a given field of view. Generally, as a target is moved through an imager's 316 field of view, potentially beneath an aperture formed by probes, wires, and other obstacles, the imager 316 collects and stores images of areas of the target that may be occluded or otherwise unavailable for imaging at a later time. Thus, memorized image information is used to fill in unavailable image information in a displayed, analyzed, or stored image.

In the preferred embodiment, obstacles are virtually removed from an image through the following method. First, the probing system 100 records a first image of a background and an obstruction at a first point in time $T_0$. Next, the probing system 100 records a second image of the background and the obstruction at a second point in time $T_1$. If the obstruction or background has shifted between time $T_0$ and time $T_1$ such that different portions of the background have been revealed, the probing system creates a composite image by replacing each portion of the obstruction with a corresponding portion of background revealed during either $T_0$ or $T_1$.

The determination regarding which pixels correspond to the moving background and which correspond to the obstructions can be accomplished in several ways. In one embodiment, an end-user designates the respective regions using a pointing device and a graphical user interface. In another embodiment, motion-measurement machine-vision algorithms, such as gradient-based optical flow or block matching, are applied to many small regions of interest on a sequence of images. In a refinement of this embodiment, information from other sources is combined with image or user-input information, to accurately track obstructions, backgrounds, and desired objects. At this point, a mask image is preferably created to separate the desired image from the obstructions.

Figure 8:
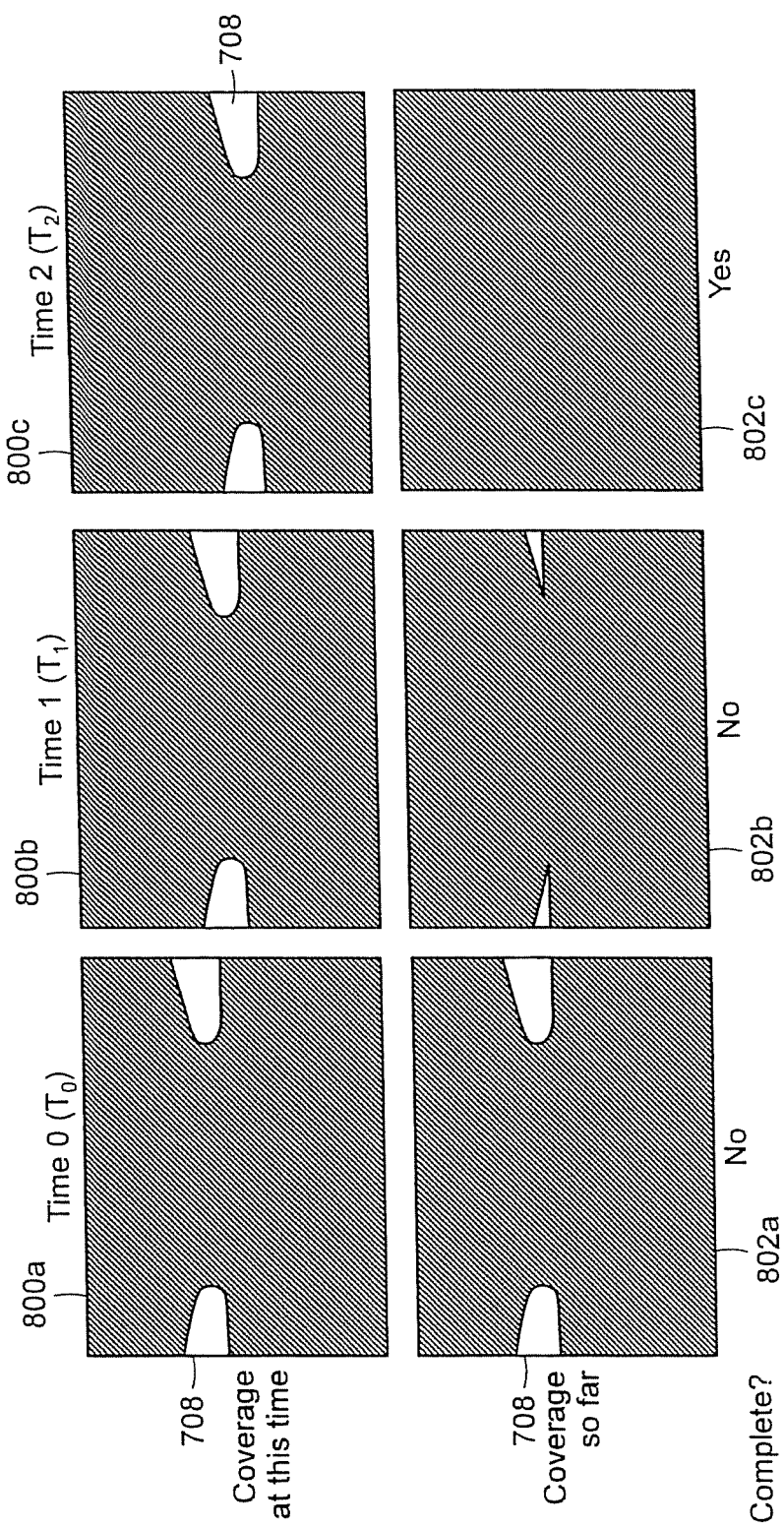
FIG. 8 illustrates the creation and use of a mask image to separate a desired image from obstructions.

FIG. 8 illustrates the creation and use of a mask image to separate a desired image from obstructions. In this image, the black pixels correspond to motion within the scene. In this case, these pixels correspond to portions of the target which shifted upward during three discrete points in time. As the target shifted upward, the image pans upward, and re-centers, in order to keep the desired objects within the field of view. Relative to the target, the probes appear to be moving downward in the field of view. Accordingly, at time $T_0$, the probes 708 appear high in the first field of view 800a. At $T_1$, the probes 708 appear in the middle of the field of view 800b. And, at $T_2$, the probes 708 appear low in the field of view 800c.

As portions of the target image are revealed due to the relative motion between the target and the probes 708, portions of the probes can be subtracted from the mask in order to generate a composite, non-current image. At time $T_0$, there has been no relative motion between the target and the probes 708, and they are shown in their entirety within the field of view 802a. At $T_1$, portions of the target that were not previously visible are now visible. Thus, portions of the probe can be replaced with the newly visible portions, generating a field of view 802b where the probes 708 have been reduced to slivers. However, the image is still slightly obstructed by the slivers of the probes 708. At $T_2$, there has been sufficient motion of the target such that, between times $T_0$ and $T_2$, all of the target has been revealed. By combining the portions of the target which were visible at all three times, the non-current composite image 802c can be generated, in which the probes have been eliminated entirely. In this fashion, obstacles of all types may be removed from the desired images.

Although the use of image superpositioning has just been discussed in terms of removal of obstacles from the image, such superpositioning is also useful to remove other optical artifacts. For example, lenses frequently produce blurred images when the image is produced at the edge or circumference of the lens. This blurring can be removed from an image by capturing a first image that has a blurred edge region and translating the object to move the regions that were blurred toward the center of the image field. Additional images are then captured with the previously blurred regions in the middle of the new fields so as to appear non-blurred. The portions of the now non-blurred images of the edge regions are then combined with the first image to take the place of the blurred images of the edge region and to create a new image without blurring at the edge.

Figure 9A:
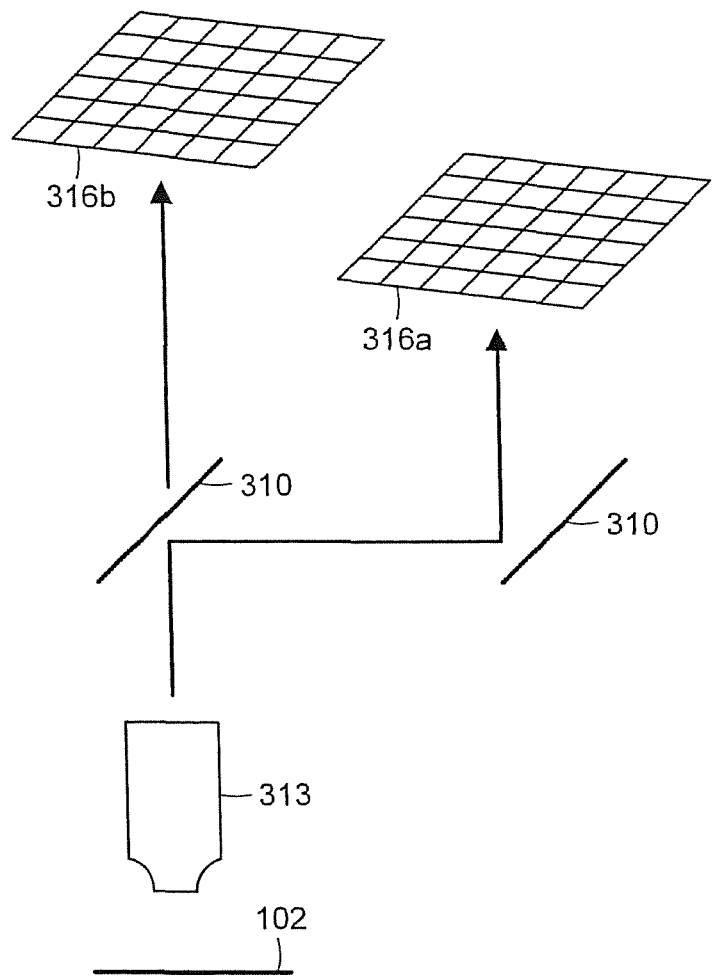
FIG. 9a is a diagram of an embodiment of the device used in which two imagers view the same field of view.

Referring to FIG. 9a, the present invention can also be used to produce a higher resolution of the images field. To produce this super pixel resolution, the two imagers 316a and 316b capture an image of the same field of view through the same objective 317. The magnification of both imagers can be the same. Although both imagers see the same field of view, because of the differences in the optical paths, each image is slightly shifted; typically less than 1 pixel.

Figure 9B:
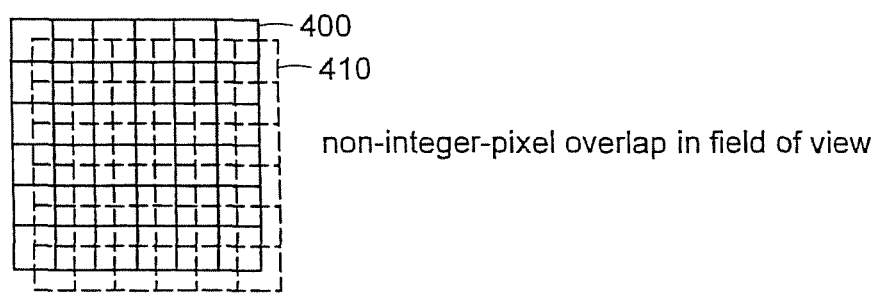

Referring also to FIG. 9b, the two images if overlapped would appear as shown. As can be seen the pixels of image 400 overlap with portions of the pixels of image 410. Any one pixel of image 400 then generally appears as if it were made up of four smaller ("quarter") pixels of image 410. By mathematically manipulating the two images an equivalent higher resolution image is formed. For example in one embodiment each "quarter pixel" may be assigned a value that is the weighted average of the nearest neighbors from the two images. Other methods are also known to one skilled in the art.

In addition, digital images may be combined from multiple imagers to provide additional information to the user. Each of these imagers may have images taken at different locations, under different polarizations (by way of different polarizers placed in the optical path), focus, color sensitivity (by way of different filters placed in the optical path), pitch, magnification numerical aperture or distortion. This additional information can thereby be used to enhance or combine the images as desired.

A further refinement of this embodiment provides another step in which this synthesized image is displayed. This display can further show an obstacle simultaneously with the synthesized image, potentially designated with a different appearance such as black-and-white or red-only or outline-only or with graphic markers. The display of the mask image can be overlaid with some degree of transparency as well, so that the overlay, the underlying target, and the geometrical relationship between them can be visualized.

In yet another embodiment, an obstacle is removed through changing the focus of the image. In the case of an imaging system 101 with high numerical aperture and small, isolated obstacles, the obstacles become substantially transparent when sufficiently out of focus. Thus, the composite image may simply be an image of the target with the obstacles sufficiently out of focus. Translating the stage 104 and imager focus together while the obstacles are stationary is analogous to translating the obstacles alone.

The flexibility of this system can be easily seen in the following application. In this application the system is used to visualize the placement of probes onto the pads of a semiconductor wafer. In this operation a semiconductor wafer on a stage is visualized by the system. A set of probes is then brought above the pads and is lowered onto the pads. Generally this is done in such a manner that the probes place sufficient pressure on the pads so as to remove or "scrub" any oxide on the pads and produce a good electrical contact. All this is irrelevant if the probes do not align properly with the pads in the first place.

The present system permits the pads to be viewed and the placement and contact between the probes and pads to be verified. The contact verification may be done in multiple ways. First the pads can be focused in an image and as the probes contact the pads they too will come into focus. When the probes are in focus, in-plane motion of the probes caused by the flexing of the probes provides an indication that contact has been made.

A second method utilizes multiple imagers centered at different planes of focus. One imager could be focused on the probe tips and one imager could be focused on the substrate. Additionally, another imager could be focused at some intermediate level. When the in-plane centers of the fields of view of all imagers are coincident, they provide a convenient means of aligning the probes and substrate as well as a means of tracking the probes and substrate as they are moved into contact.

In sum, improved methods and systems for imaging are provided. Specifically, systems and methods for extending the range of a digital zoom are provided in which an imaging system provides continuous magnification over a plurality of interleaved optical pathways and digital zooming imagers. Systems and methods of centering an image as the field of view changes, and for masking out undesirable obstacles from a magnified image are also provided.

Variations, modification, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

The invention claimed is:

1. A method of presenting an object to be imaged over an extended zoom range, the method comprising:
   capturing a first digital image of the object at a first optical magnification;
   capturing a second digital image of the object at a second optical magnification concurrently with the capturing the first digital image, wherein the second optical magnification is greater than the first optical magnification;
   presenting a presented image of the object at a desired magnification, wherein the presenting includes:
   digitally zooming within the first digital image to produce the presented image when the desired magnification is less than the second optical magnification; and
   digitally zooming within the second digital image to produce the presented image when the desired magnification is greater than the second optical magnification.

2. The method of claim 1, wherein the method further includes transitioning from the digitally zooming within the first digital image to the digitally zooming within the second digital image.

3. The method of claim 2, wherein the transitioning includes automatically transitioning responsive to the desired magnification changing from a first desired magnification that is less than the second optical magnification to a second desired magnification that is greater than the second optical magnification.

4. The method of claim 2, wherein the transitioning includes transitioning without temporal interruption.

5. The method of claim 2, wherein capturing the first digital image includes capturing the first digital image from a first optical pathway, wherein capturing the second digital image includes capturing the second digital image from a second optical pathway, and further wherein the transitioning includes transitioning without changing either of the first optical pathway and the second optical pathway.

6. The method of claim 5, wherein the transitioning includes transitioning without physically moving parts that define the first optical pathway and the second optical pathway.

7. The method of claim 2, wherein the transitioning includes continuously presenting the presented image during the transitioning.

8. The method of claim 1, wherein capturing the first digital image includes capturing the first digital image from a first optical pathway, and further wherein capturing the second digital image includes capturing the second digital image from a second optical pathway that is partially coextensive with, but different from, the first optical pathway.

9. The method of claim 1, wherein the presenting includes consecutively presenting a first plurality of presented images of varying magnification that is produced from the first digital image and consecutively presenting a second plurality of presented images of varying magnification that is produced from the second digital image.

10. The method of claim 1, wherein the method further includes simultaneously presenting the first digital image and the second digital image.

11. The method of claim 10, wherein the simultaneously presenting includes simultaneously presenting a plurality of digital images including the first digital image, the second digital image, and the presented image.

12. The method of claim 10, wherein the method further includes selectively controlling at least one of the first optical magnification and the second optical magnification.

13. The method of claim 1, wherein the presenting includes at least one of presenting the presented image on a display, outputting data that describes the presented image to a computer system, and storing data that describes the presented image.

14. The method of claim 1, wherein the method further includes centering the first digital image and the second digital image on a target portion of the object.

15. The method of claim 1, wherein the digitally zooming within the first digital image includes digitally zooming within a range bounded by the first optical magnification and the second optical magnification.

16. The method of claim 1, wherein the presenting includes sequentially presenting a plurality of presented images of different magnifications, wherein a first portion of the plurality of presented images is produced from the first digital image, and further wherein a second portion of the plurality of presented images is produced from the second digital image.

17. The method of claim 1, wherein the presenting includes presenting a first presented image at a first desired magnification and presenting a second presented image at a second desired magnification, wherein the first desired magnification is between the first optical magnification and the second optical magnification, and further wherein the second desired magnification is greater than the second optical magnification.

18. The method of claim 1, wherein the method further includes capturing a third digital image of the object from a third optical pathway at a third optical magnification concurrently with the capturing the first digital image and the capturing the second digital image, wherein the third optical magnification is greater than the second optical magnification, and further wherein the presenting includes digitally zooming within the third digital image to produce the presented image when the desired magnification is greater than or equal to the third optical magnification.

19. An imaging system for imaging an object, the imaging system comprising:
   a first digital imaging device that captures a first digital image of the object at a first optical magnification;
   a second digital imaging device that captures a second digital image of the object at a second optical magnification that is greater than the first optical magnification;
   a presentation device that presents a presented image of the object at a desired magnification; and
   a computer system that controls the operation of the first digital imaging device, the second digital imaging device, and the presentation device using the method of claim 1.

20. The imaging system of claim 19, wherein the imaging system includes a first optical pathway that extends between the object and the first digital imaging device and a second optical pathway that extends between the object and the second digital imaging device, wherein the first optical pathway is different from, but partially coextensive with, the second 21. A digitally zooming microscope, comprising:
- a light source that illuminates an object to be imaged;
- a first optical pathway that projects a first image of the object upon a first digital imaging device at a first optical magnification;
- a second optical pathway that projects a second image of the object upon a second digital imaging device at a second optical magnification that is greater than the first optical magnification;
- a display for presenting a presented image of the object at a desired magnification; and
- a computer system that controls the operation of the digitally zooming microscope using the method of claim 1.

22. A method of providing continuous magnification within an imaging system over an extended zoom range, the method comprising:
- presenting a first image that has been magnified by way of a first optical pathway;
- digitally zooming within the first image within a range bounded by a first optical magnification provided in the first optical pathway and a second optical magnification provided in a second optical pathway that is different from the first optical pathway; and
- when the digitally zoomed first image meets or exceeds the second optical magnification, presenting, without temporal interruption, a second image that has been magnified by way of the second optical pathway, wherein the second image is captured from the second optical pathway concurrently with capture of the first image from the first optical pathway.

* * * * *

(continuation from previous page:)
optical pathway, and further wherein the first digital imaging device captures the first digital image from the first optical pathway and the second digital imaging device captures the second digital image from the second optical pathway.